Oct. 30, 1951 H. A. BAUER 2,573,534

TELEPHONE ADDRESS INDEX OR REGISTER

Filed July 12, 1946 3 Sheets-Sheet 1

INVENTOR.
Hans A. Bauer,
BY
Carl P. Zepper
Atty

Oct. 30, 1951 H. A. BAUER 2,573,534

TELEPHONE ADDRESS INDEX OR REGISTER

Filed July 12, 1946 3 Sheets-Sheet 2

INVENTOR.

Hans A. Bauer,

BY

Carl F. Geppert

Atty

TELEPHONE ADDRESS INDEX OR REGISTER

Filed July 12, 1946 3 Sheets-Sheet 3

INVENTOR.
Hans A. Bauer,
BY
Carl F. Geppert
Atty.

Patented Oct. 30, 1951 2,573,534

UNITED STATES PATENT OFFICE 2,573,534

TELEPHONE-ADDRESS INDEX OR REGISTER

Hans A. Bauer, Prairie View, Ill., assignor to Autopoint Company, Chicago, Ill., a corporation of Illinois Application July 12, 1946, Serial No. 683,063

13 Claims. (Cl. 40—104)

The present invention relates to a register and especially to a novel loose leaf index or register for facilitating the selection of a telephone number, address or other desired data.

Among the objects of the present invention is the provision of a novel selector mechanism for operating a register or index and so constructed and arranged as to open the cover and select and expose or exhibit any chosen sheet or card for quickly making available desired information appearing on such selected sheet or card, the selector mechanism being automatically returned to its neutral position upon closing the cover.

A further object is the provision of a novel key-actuated means for selecting a desired card or sheet carrying certain desired information, such as telephone numbers, addresses and the like preferably arranged in alphabetical order. A plurality of suitably spaced keys or push buttons are provided adjacent the front of the index or register, and these are preferably marked with one or more letters of the alphabet.

Another important feature of the present invention is the provision of a novel mechanism for selecting a desired card or sheet by a single operation initiated by the depressing of a single key. It requires no preliminary selection, adjustment or other movement as required with prior devices. Furthermore, the upper or outer face of the cover or closure is unobstructed and not marred by the inclusion of various exposed mechanisms including dials, indicators, etc.

The present invention further comprehends a novel means and manner of pivotally mounting the cards or sheets in such manner that any one or more of these cards may be inserted, removed or replaced, when desired.

Another object of the present invention is the provision of a novel casing or housing comprising a base and a cover or closure pivotally mounted at one end to the base, the cover or closure being so constructed and mounted upon the base that in the event the operator or user presses one of the keys or push buttons, he initiates selector mechanism for engaging and elevating the sheet or card selected as well as those above or preceding the one selected and exposing and retaining the sheet or card desired in an open position upon the release of the cover which occurs immediately after or substantially simultaneously with the selection of the card. In other words, actuating any one of the keys exposes the underside or bottom surface of one card and the upper surface or face of the succeeding card, thereby exposing the successive or adjacent faces of two cards and permitting the use of a minimum number of keys or push buttons to cover the alphabet. In addition, the base is provided with a compartment for receiving and retaining additional memo sheets or papers. Access to this compartment is readily had by lifting the support carrying the alphabetically arranged sheets or cards.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Figure 1:
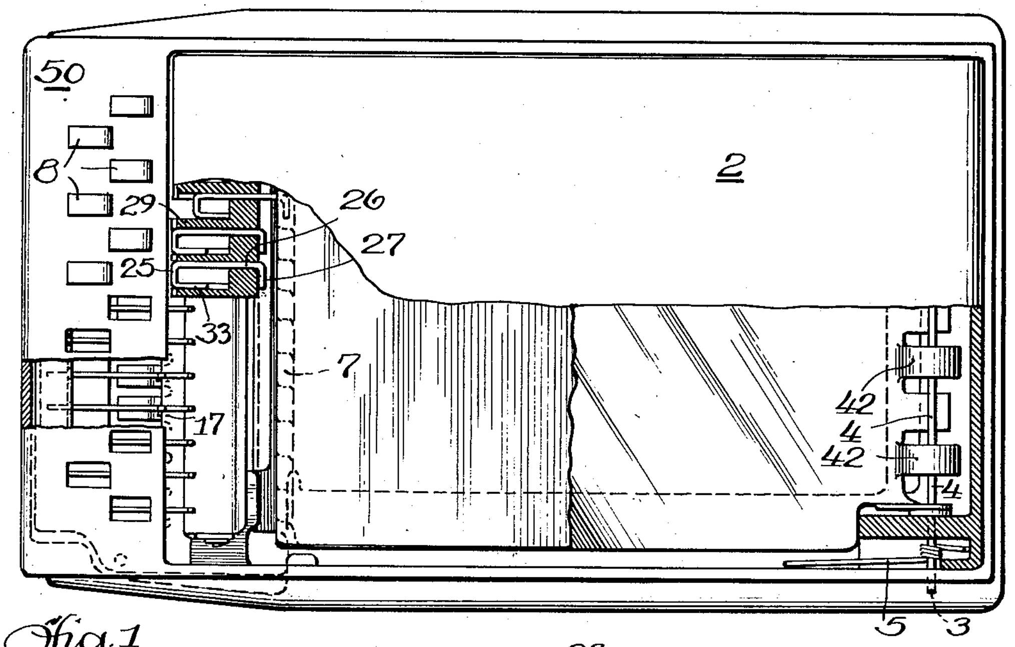
Figure 1 is a top plan view of the novel register or index with portions broken away to more clearly disclose the interior mechanism.
Figure 2:
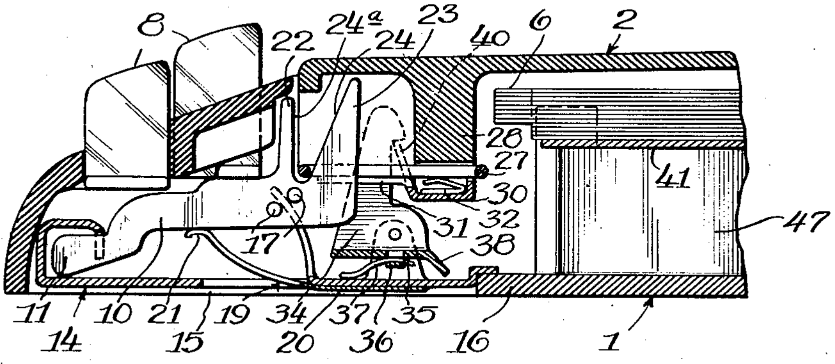
Fig. 2 is an enlarged fragmentary view in vertical cross-section through one end of the register or index.
Figure 3:
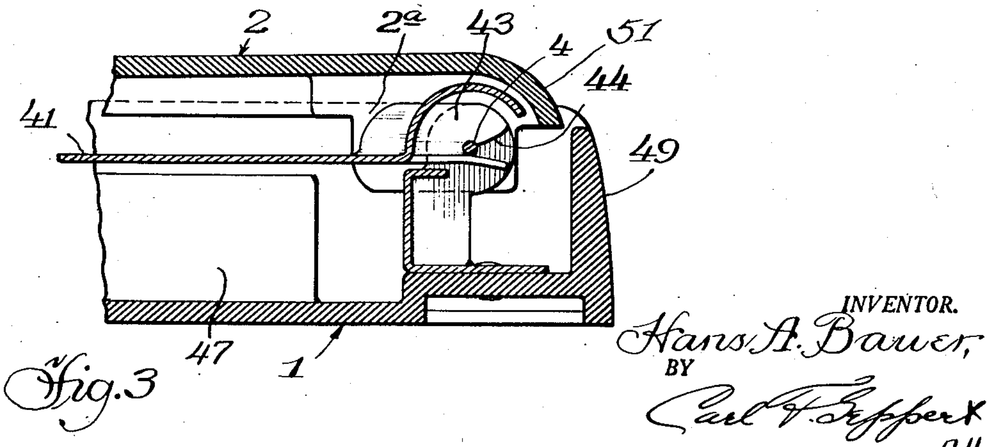
Fig. 3 is an enlarged fragmentary view in vertical cross-section through the other end of the register or index.

Referring more particularly to the illustrative embodiment shown in the drawings, the novel register or index comprises a base 1, a top, cover or closure 2 pivotally mounted on the opposite ends 3 of a cross pin or rod 4 and provided adjacent the ends of the pin or rod 4 with suitable tensioning means such as a spring 5 adapted to tension and raise the cover or closure 2 to any desired angle with respect to the base for exposing the face of one of a plurality of cards or sheets 6 and the back of the adjacent card or sheet appearing directly thereabove.

Figure 4:
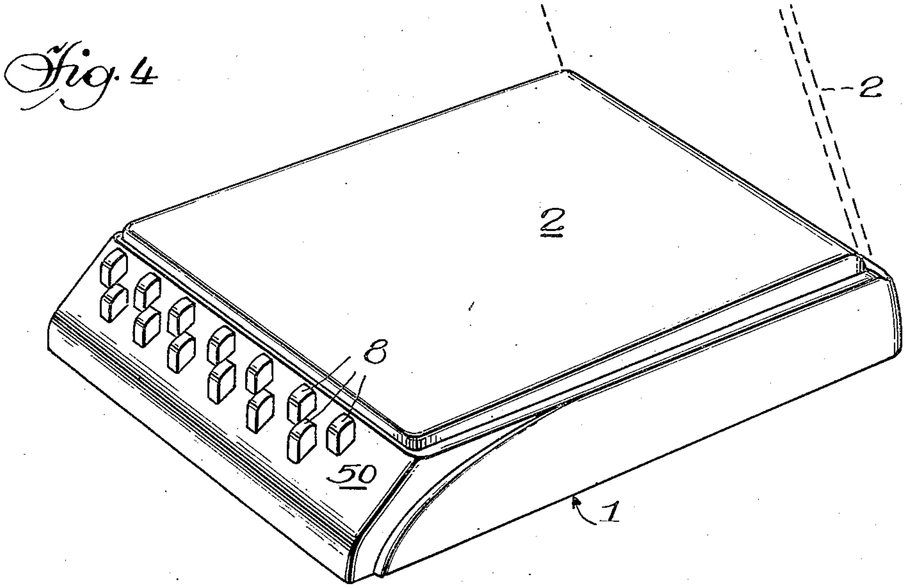
Fig. 4 is a perspective view of the closed assembly but showing in dotted outline the cover moving to an elevated position for exposing the desired card.
Figures 7, 8, 9, 10, 11, 12, 13:
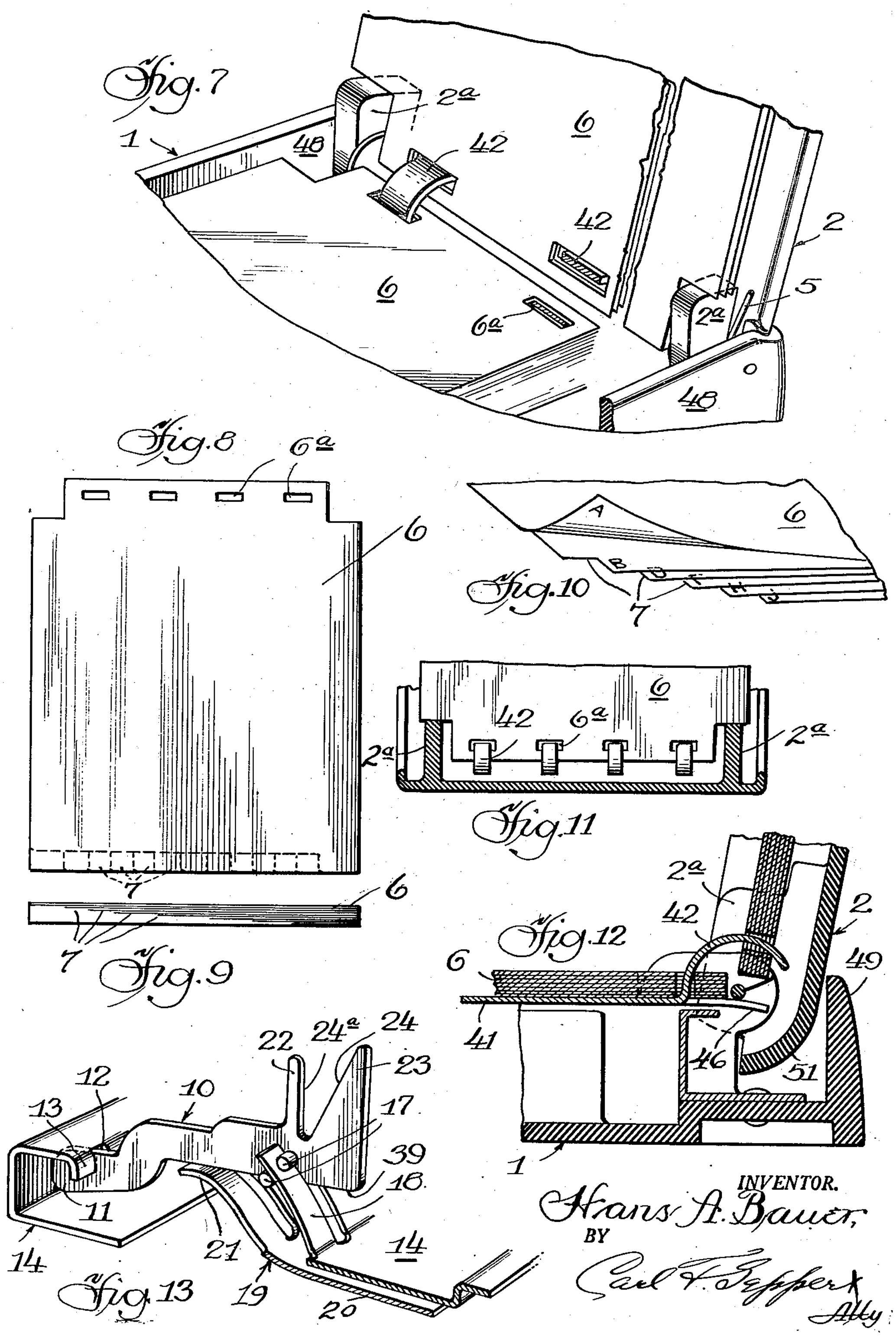
Fig. 7 is an enlarged fragmentary view in perspective of the pivoted end of the index or register and showing it in open position with several of the upper cards or sheets elevated and resting upon hinge elements on the cover.
Fig. 8 is a plan view of the series of cards or sheets.
Fig. 9 is an end view thereof.
Fig. 10 is a fragmentary perspective view of a corner of a plurality of these cards or sheets.
Fig. 11 is a fragmentary view in vertical cross-section of the cover in open position as in Fig. 7, and showing how the open cards or sheets bear or rest on the hinge elements on the cover.
Fig. 12 is a view similar to Fig. 3 but showing the cover and some of the cards or sheets in open or elevated position.
Fig. 13 is a fragmentary perspective view showing one of the arms and its associated assembly for indexing one of the sheets.

The sheets or cards 6 are preferably of uniform overall length except for the bottom card, and except for the bottom and top cards each is provided at its inner edge with staggered cutouts 7 (see Figs. 2, 8, 9 and 10) to permit the indexing and elevating of any one of the sheets or cards, including the cards or sheets resting on top of the one thus selected. The cards or sheets 6, except for the top and bottom ones, are shown as provided with a cut-out, the bottom one being shorter than the remainder, the top one being formed without a cut-out, and the intermediate cards being formed as in Figs. 8, 9 and 10. As there shown, the card "B" appearing second from the top is provided with but a short cut-out, with the cut-out of the next succeeding cards increasing in width across the front edge of the cards until the last card is cut away across its entire width for the reason that no one of the indexing members 26 is adapted to engage thereunder for elevating this card. Such indexing is initiated through a series of keys or push buttons 8 which may be located in two rows, with the individual keys or buttons spaced and staggered as shown in Figs. 1 and 4. The base 9 of each key or button seats upon an arm 10 having an end 11 disposed in a slot 12 provided in the downwardly projecting flange 13 of a plate 14 secured within a transverse opening 15 in the bottom wall 16 of the base 1. Each arm is provided with laterally extending pins or projections 17, 17 adapted to receive therebetween one of a series of spaced, curved tongues or guide members 18 bent or deformed from the plate 14. Spaced leaf spring 19 has one end 20 secured to the underside of the plate 14 and has its other end 21 deformed and bearing against the underside of the arm 10 for returning each arm and its key 8 to its inoperative position upon the release of pressure exerted upon the selector key by the operator.

Each arm 10 pivots or is fulcrumed about the base of the curved or rounded end 11 and adjacent its other end is provided with spaced upwardly projecting legs 22 and 23, the latter having an outwardly and upwardly inclined surface 24 and the former a surface $24^a$ that is inclined upon actuation of the arm 10. These projecting legs are adapted to receive therebetween an end 25 of an indexing member 26, the opposite end 27 of which is adapted to engage under a card or sheet 6 when moved into forwardly extended position by the surface $24^a$.

The cover or closure 2 is pivotally mounted at one end upon the cross rod or pin 4 by means of the spaced hinge elements $2^a$, and adjacent its opposite end is formed or provided with a depending and transversely projecting rib 28 and spaced longitudinally extending walls or partitions 29. Each rib carries at its lower end a channel-shaped member 30 having a plurality of spaced and laterally extending tongues or fingers 31 each adapted to support an indexing member 26 with the latter being slidable thereover. A leaf spring 32 seats against the underside of each indexing member and with the latter slidable in a recess formed between the member 30 and the lower end of the rib 28. As shown in Fig. 1, each indexing member at its end 25 is bent or formed in such manner as to lie between and be guided by adjacent spaced walls 29 with the return bend 33 limited in its forward movement by engagement with the face of the rib. The end 27 of each indexing member is transversely bent to enter a slot or cut-out 7 in the stack of cards or sheets 6 and upon release of the cover or closure, engages the underside of the card or sheet directly above the cut-out or slot and elevates the cards or sheets above such cut-out with the cover to thereby expose and exhibit or reveal the underside of the card or sheet directly above the indexing member and the face of the card directly below the latter.

Figure 5:
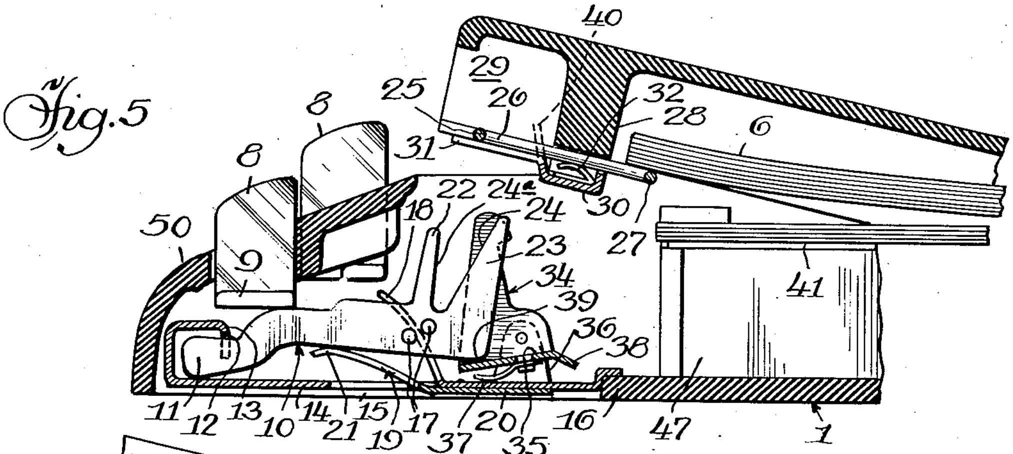
Fig. 5 is an enlarged view similar to Fig. 2 but showing one of the keys or push buttons actuated for releasing the cover and exposing or exhibiting a desired card.
Figure 6:
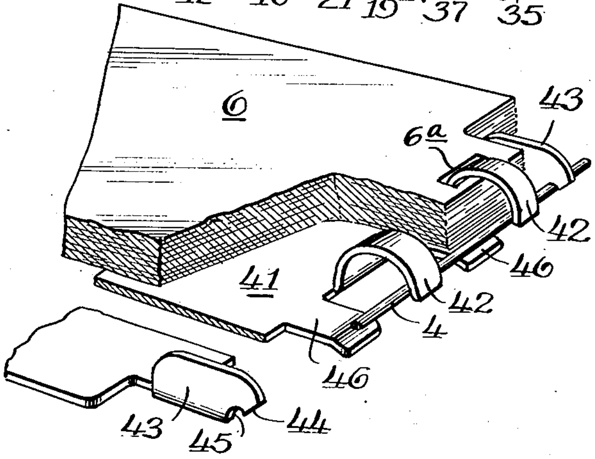
Fig. 6 is a fragmentary view in perspective of the supporting plate and manner of pivotally mounting the sheets or cards in position.

In order to retain the cover 2 in lowered, closed position, a pair of latches 34, 34 are provided. One of these latches is disposed at each end of a rocking plate 35 pivotally mounted at each end upon a lug or upstanding ear 36 and biased toward latching position by means of a spring 37. The rear 38 of this plate is bent or turned down to form a stop limiting the movement of the latches in one direction. These latches are normally moved to latched or upright position by the spring 37 but upon the pressing of a key or button 8 to engage its respective arm 10, the latter pivots or fulcrums about its rounded or curved end 11 whereby the opposite end 39 engages the rocking plate 35 (see Fig. 5) and releases the latches 34 from locking engagement with an upwardly projecting catch 40 provided on the channel member 30. However, the arc of movement of the arm 10 and its construction and arrangement is such that prior to release of the cover or closure 2 from its latched or locked position and its swinging to open position through the tension means or springs 5, the selected indexing member 26 has been advanced by the surface $24^a$ of the projecting leg 22 on the arm 10 to engage beneath the selected card or sheet 6.

The sheets or cards 6 are carried upon a support 41 which may be of metal or other suitable rigid material. At its rear end this support is formed or provided with spaced arcuate projections 42 shaped for reception in similarly spaced slots or openings $6^a$ in the cards or sheets 6. Adjacent the opposite edges and spaced from the projections 42, the support is provided with laterally projecting ears or flanges 43 each having its end 44 inclined and merging into a recess 45 for the reception of the cross pin or rod 4. To maintain the support upon this cross pin or rod 4, yet permit it to be readily removed with its cards or sheets 6 when the occasion arises, the support is further provided with longitudinally extending spaced spring fingers or projections 46 having their ends turned or bent downwardly sufficient to guide the support onto the cross pin or rod 4 until the pin or rod seats in the recess 45, whereby the support is retained against accidental removal or displacement by the tension of the fingers 46.

Upon closing the cover 2, the arm 10 being in neutral position and held thereby the end 21 of the spring 19, this arm automatically returns its indexing member 26 or selector mechanism to its neutral or retracted position due to the camming action of the inclined surface 24 on the projection or leg 23.

Upon the base 1 of the register or index is provided a compartment 47 for receiving and retaining memo sheets or papers which are readily accessible upon the release of the cover and the lifting of the support 41 carrying the indexing cards or sheets 6.

The base 1 is provided with upstanding side walls 48, 48, an upstanding rear wall 49 and an inclined front wall 50, while the cover or closure 2 is provided with a curved rear edge 51 so formed as to permit the cover to open to the desired position but limited by the rear wall 49 of the base.

From the above description and the disclosure in the drawings, it will be readily apparent that the present invention comprehends a novel loose-leaf telephone or address index or register that is readily and easily manipulated and requires but a single operation for selecting and exposing a desired card or sheet. Furthermore, upon closing of the cover, the selector mechanism is automatically moved to neutral position and permits the mere depressing of any chosen key to actuate the selector mechanism for selecting and exposing a desired card.

Having thus disclosed my invention, I claim:

1. A telephone and address index comprising a casing including a base, a cover pivotally mounted upon the base and providing therebetween an enclosure, means for holding the cover in closed position but permitting its quick release to open position, a plurality of cards having the telephone numbers, addresses or other data arranged in alphabetical order and with the cards pivotally mounted at one end in the casing and with the other end normally free, an indexing member for each card slidably carried in the cover and adapted to be moved beneath and engage a selected card for elevating that card and those thereabove for exposing the under surface of the card selected and the face of the next succeeding card, and selector means at the front of the base including a plurality of push buttons arranged in alphabetical order for selectively actuating an indexing member and releasing the cover for exposing a selected card.

2. An index or register for selecting and exposing any one of a series of cards containing names and telephone numbers, addresses or other desired data, comprising a housing including a base, a spring-actuated cover pivotally mounted at one end to the base, a series of suitably designated cards carried in the housing, a series of keys on the base having similar designations as those on the cards, indexing mechanism including an arm fulcrumed in the base and an indexing member in the cover aligned with each key and adapted to be actuated by depressing a key for indexing a desired card and carrying this card with the cover to open position upon release of the latter, and latching means for holding the cover in closed position and controlled by the depressing of a key for releasing the cover and the indexed card.

3. An index or register for selecting and exposing any one of a series of cards containing names and telephone numbers, addresses or other desired data, comprising a casing including a base and a pivoted closure, a support and a plurality of indexing cards disposed thereon, said support having one end free and the other end pivotally mounted on the casing but adapted to be readily detached therefrom for removal or replacement of any one or more of the cards, slidable indexing members carried in the closure adjacent the free ends of the cards and each adapted to engage under one of the cards when moved relative thereto, key actuated means for moving any one of the indexing members into engagement with its respective card and releasing the cover for swinging movement, and spring means for moving the closure into open position in which it carries along those cards above the indexing member so as to expose the undersurface of the indexed card and the face of the next succeeding card.

4. An index or register for selecting and disclosing desired data on any one of a series of suitably designated sheets arranged in a predetermined sequence, comprising a casing including a base, a cover pivotally mounted at its rear end upon the rear end of the base, a plurality of sheets arranged in a predetermined sequence and carried in the casing, slidable indexing members in the cover each adapted to selectively engage a desired sheet and carry this sheet and those overlying it into open position upon movement of the cover to open position and thereby exposing the back surface of the engaged sheet and the face of the succeeding sheet, a series of keys arranged in spaced relation on the base and having designations similar to those of the sheets, latching means for holding the cover in closed position, and tripping mechanism actuated by depressing any desired key for operating an indexing member for selecting a sheet and for releasing the latching means, the cover being spring-actuated and biased to open position.

5. An index or register for selecting and exposing any one of a series of suitably designated cards adapted to contain desired data and arranged in a predetermined sequence, comprising a casing including a base, a spring-actuated cover pivotally mounted at one end to the base and biased to open position, a series of suitably designated cards carried in the casing, a series of keys disposed at the front of the casing and having similar designations as those on the cards, an indexing arm engaged by each key and adapted to be actuated by the depressing of its respective key, an indexing member in the cover associated with each arm and actuated by movement of the arm for engaging and supporting a desired card with the cover, and latching means for retaining the cover in closed position but released upon movement of an indexing arm when the latter is depressed by actuation of its key whereby the cover is biased to open position and carries therealong the desired card.

6. In a loose-leaf index or register for facilitating the selection of any one of a plurality of cards adapted to contain the names, telephone numbers, addresses or other desired data of a selected list, comprising a casing including a hollow base having at its forward end a series of spaced keys arranged in a predetermined sequence and having thereon desired designations, a spring-actuated cover biased toward open position, a plurality of cards pivotally mounted in the casing, indexing means carried by the cover for engaging any one of said cards and carrying it with the cover to open position, latching means for locking the cover in closed position, and means operated by depressing of a key for actuating its respective index member for engaging the selected card and synchronously therewith actuating the latching means for releasing the cover whereby the cover and the selected card are elevated to a position to expose the data on the back of the selected card and that on the face of the succeeding card.

7. In a loose-leaf index or register for facilitating the selection of any one of a plurality of cards arranged in alphabetical order and adapted to contain desired information of a selected list, comprising a casing, a closure for the casing, tension means for biasing the closure to open position, latching means for locking the closure in closed position upon the casing, a plurality of alphabetically arranged cards pivotally mounted at one end in the casing and normally free at their free end, a plurality of indexing members slidably mounted in the closure adjacent the free end and each adapted to be moved into engagement with an edge of its respective card, cut-outs provided in the free end of said cards to permit one of the indexing members to engage a selected card and to support that card and those lying thereabove below the closure, and means including a plurality of keys adapted to be depressed by the operator and each key connected to its respective indexing member in such manner that when a key is depressed, its respective indexing member is moved to a position beneath the adjacent end of its respective card and upon release of the closure said card is elevated with the closure to expose the data thereon.

8. In an index or register, a casing including a base and a spring-actuated cover pivotally mounted upon the base and biased toward open position, latching means for retaining the cover in closed position but permitting its quick release to open position, a plurality of cards containing desired information or data pivotally carried at one end in the casing and having their other end free, and selector mechanism carried by the base and cover adjacent the free end of the cards and including spaced arms fulcrumed for vertical movement in the base, spaced indexing members each aligned with and actuated by movement of an arm, and a plurality of keys on the base each of which when depressed actuates the selector mechanism which selects and exposes the selected card when the cover is released and moved to open position, and when the cover is again closed the selector mechanism is automatically moved to inoperative position.

9. In an index, a base and a pivoted cover, a plurality of sheets containing recorded information or data arranged in alphabetical order, means for pivotally mounting the sheets in the base, means for selecting a desired sheet and latching it to the cover whereby the sheet is carried into open position upon opening the cover, said means including a plurality of selector arms mounted in the base, and an elongated comb-spring extending transversely of the base and secured along its forward edge to the base, said spring having resilient projections engaging the underside of the selector arms and tending to move them to raised, inoperative position.

10. A telephone and address index comprising a casing including a base, a spring-actuated cover pivotally mounted at one end upon the base and biased toward open position, means for holding the cover in closed position but permitting its quick release to open position, a plurality of indexing keys provided at the forward end of the base, a plurality of data-carrying cards pivotally mounted in the casing, indexing means slidably carried in the cover, selector means carried in the base and actuated by depressing a key and engaging the indexing means to engage a selected card upon actuation of its selected key, and means for synchronously operating the selected indexing means and release of the cover from the holding means to expose a selected card.

11. An index including a pack of loose-leaf index cards each having an alphabetical indicia thereon, comprising a casing for enclosing the cards and including a base and a pivoted cover, means for pivotally supporting the cards in the casing, a series of keys mounted at the front of the base and arranged in alphabetical order corresponding with indicia on the cards, and means including a plurality of indexing members slidably mounted in the cover and each associated with a key and its corresponding card and adapted upon the operator actuating a selected key to select and engage its corresponding card and separate said selected card and those above the same from the remainder in the base when the cover is swung to its open position, whereby the selected card is held in open position in the cover and exposed to view.

12. An index including a pack of loose-leaf index cards each having indicia thereon, comprising a casing enclosing these cards, said casing including a base for supporting the cards in a horizontal position and a hollow cover pivotally mounted on the base for covering the cards when in closed position and exposing an upper and a lower card to view when in open position, means for pivotally supporting the cards in the casing, an inclined wall at the front of the base, a plurality of finger-actuated keys disposed in staggered relation across the inclined wall, a plurality of arms pivotally mounted in the base with an arm associated with each key, and means operable upon the actuation of a key and its arm to select a card to be elevated to open position with the cover.

13. An index including a pack of loose-leaf index cards each having indicia thereon, comprising a casing enclosing these cards, said casing including a base for supporting the cards in a horizontal position and a hollow cover pivotally mounted on the base for covering the cards when in closed position and exposing an upper and a lower card to view when in open position, means for pivotally supporting the cards in the casing, an inclined wall at the front of the base, finger-actuated keys arranged in spaced relation across the inclined wall, a plurality of arms projecting longitudinally of the casing with each arm associated with a key and fulcrumed upon the base in such manner that actuation of a key moves its arm about its fulcrum, and indexing means associated with each arm for engaging beneath a selected card from the pack and as the cover is moved to open position this selected card is carried therewith and exposed to view.

HANS A. BAUER.

REFERENCES CITED

The following references are of record in the file of this patent:

UNITED STATES PATENTS

| Number | Name | Date |
|---|---|---|
| 2,115,537 | Peter | Apr. 26, 1938 |
| 2,141,761 | Pollock | Dec. 27, 1938 |
| 2,186,436 | Shaler | Jan. 9, 1940 |
| 2,341,983 | Faas | Feb. 15, 1944 |
| 2,494,167 | Faas | Jan. 10, 1950 |
| 2,513,422 | Neilsen | July 4, 1950 |